United States Patent
Roberts et al.

(10) Patent No.: US 9,106,804 B2
(45) Date of Patent: Aug. 11, 2015

(54) SYNTHESIZING A PRESENTATION OF A MULTIMEDIA EVENT

(75) Inventors: Dale T. Roberts, San Anselmo, CA (US); Randall E. Cook, Kensington, CA (US); Markus K. Cremer, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 1125 days.

(21) Appl. No.: 12/239,082

(22) Filed: Sep. 26, 2008

(65) Prior Publication Data

US 2009/0087161 A1    Apr. 2, 2009

Related U.S. Application Data

(60) Provisional application No. 60/976,186, filed on Sep. 28, 2007.

(51) Int. Cl.
*G06F 17/00* (2006.01)
*H04N 7/173* (2011.01)
(Continued)

(52) U.S. Cl.
CPC .......... *H04N 7/17336* (2013.01); *G11B 27/031* (2013.01); *G11B 27/10* (2013.01); *G11B 27/28* (2013.01); *G11B 27/34* (2013.01); *H04N 5/262* (2013.01); *H04N 21/21805* (2013.01); *H04N 21/2743* (2013.01); *H04N 21/8549* (2013.01);
(Continued)

(58) Field of Classification Search
CPC ............ G06F 17/30017; G06F 17/211; G06F 17/3089; G06F 17/212; G06F 17/30843; G06F 17/243; G06F 17/2247; G06F 17/245; G06F 3/30882; H04N 21/21805; H04N 21/2743; H04N 21/8549

USPC ........................... 715/203, 723–732; 382/173
See application file for complete search history.

(56) References Cited

U.S. PATENT DOCUMENTS 5,515,490 A * 5/1996 Buchanan et al. ............ 715/209
5,918,223 A    6/1999 Blum et al.
(Continued)

FOREIGN PATENT DOCUMENTS

EP    240794 A2    10/1987
EP    969399 A2    1/2000
(Continued)

OTHER PUBLICATIONS

"International Application Serial No. PCT/US2008/077843, International Search Report mailed Dec. 2, 2008", 4 pgs.
(Continued)

*Primary Examiner* — Quoc A Tran
(74) *Attorney, Agent, or Firm* — Schwegman Lundberg & Woessner, P.A.

(57) ABSTRACT

Example embodiments of a media synchronization system and method for synthesizing a presentation of a multimedia event are generally described herein. In some example embodiments, the media synchronization system includes a media ingestion module to access a plurality of media clips received from a plurality of client devices, a media analysis module to determine a temporal relation between a first media clip from the plurality of media clips and a second media clip from the plurality of media clips, and a content creation module to align the first media clip and the second media clip based on the temporal relation, and to combine the first media clip and the second media clip to generate the presentation.

39 Claims, 6 Drawing Sheets

(51) Int. Cl.

| | | |
|---|---|---|
| *G11B 27/031* | (2006.01) | |
| *G11B 27/10* | (2006.01) | |
| *G11B 27/28* | (2006.01) | |
| *G11B 27/34* | (2006.01) | |
| *H04N 5/262* | (2006.01) | |
| *H04N 21/218* | (2011.01) | |
| *H04N 21/2743* | (2011.01) | |
| *H04N 21/8549* | (2011.01) | |
| *G06F 17/24* | (2006.01) | |
| *G06F 17/21* | (2006.01) | |
| *G06F 17/22* | (2006.01) | |
| *G06F 17/30* | (2006.01) | |

(52) U.S. Cl.
 CPC ............ *G06F 17/211* (2013.01); *G06F 17/212* (2013.01); *G06F 17/2247* (2013.01); *G06F 17/243* (2013.01); *G06F 17/245* (2013.01); *G06F 17/30017* (2013.01)

(56) References Cited

U.S. PATENT DOCUMENTS

| | | | |
|---|---|---|---|
| 6,144,375 A * | 11/2000 | Jain et al. | 715/251 |
| 6,262,777 B1 | 7/2001 | Brewer et al. | |
| 6,452,875 B1 | 9/2002 | Lee et al. | |
| 6,505,160 B1 | 1/2003 | Levy et al. | |
| 6,829,368 B2 | 12/2004 | Meyer et al. | |
| 6,941,275 B1 | 9/2005 | Swierczek | |
| 7,006,881 B1 | 2/2006 | Hoffberg et al. | |
| 7,302,574 B2 | 11/2007 | Conwell et al. | |
| 7,349,552 B2 | 3/2008 | Levy et al. | |
| 7,415,129 B2 | 8/2008 | Rhoads | |
| 7,461,136 B2 | 12/2008 | Rhoads | |
| 7,587,602 B2 | 9/2009 | Rhoads | |
| 7,590,259 B2 | 9/2009 | Levy et al. | |
| 2003/0058268 A1 * | 3/2003 | Loui et al. | 345/719 |
| 2004/0260669 A1 | 12/2004 | Fernandez | |
| 2005/0033758 A1 * | 2/2005 | Baxter | 707/100 |
| 2006/0263037 A1 | 11/2006 | Gilley | |
| 2007/0189708 A1 * | 8/2007 | Lerman et al. | 386/52 |
| 2012/0079515 A1 * | 3/2012 | Wang et al. | 725/9 |
| 2013/0010204 A1 * | 1/2013 | Wang | 348/725 |

FOREIGN PATENT DOCUMENTS

| | | |
|---|---|---|
| EP | 1197020 B1 | 11/2007 |
| WO | WO-2009042858 A1 | 4/2009 |

OTHER PUBLICATIONS

"International Application Serial No. PCT/US2008/077843, Written Opinion mailed Dec. 2, 2008", 4 pgs.

"European Application Serial No. 08832944.6—EP Search Report", 8 pgs, Nov. 6, 2012.

"International Application Serial No. PCT/US2008/077843, International Preliminary Report on Patentability mailed Apr. 8, 2010", 4 pgs.

* cited by examiner

SYSTEM ARCHITECTURE

SYNTHESIZING A PRESENTATION OF A MULTIMEDIA EVENT

CLAIM OF PRIORITY

The present patent application claims the priority benefit of the filing date of U.S. provisional application no. 60/976,186 filed Sep. 28, 2007, the entire content of which is incorporated herein by reference.

TECHNICAL FIELD

Some example embodiments relate generally to media synchronization and, in particular, to synthesizing a presentation of a multimedia event.

BACKGROUND

In the early 21st century, devices like digital cameras and mobile phones, capable of recording movies, became ubiquitous. Because recording devices are everywhere, essentially every public event of note is being recorded, by many different people, each in a slightly different way. These recordings may be shared on various web sites.

DETAILED DESCRIPTION

Figure 1:
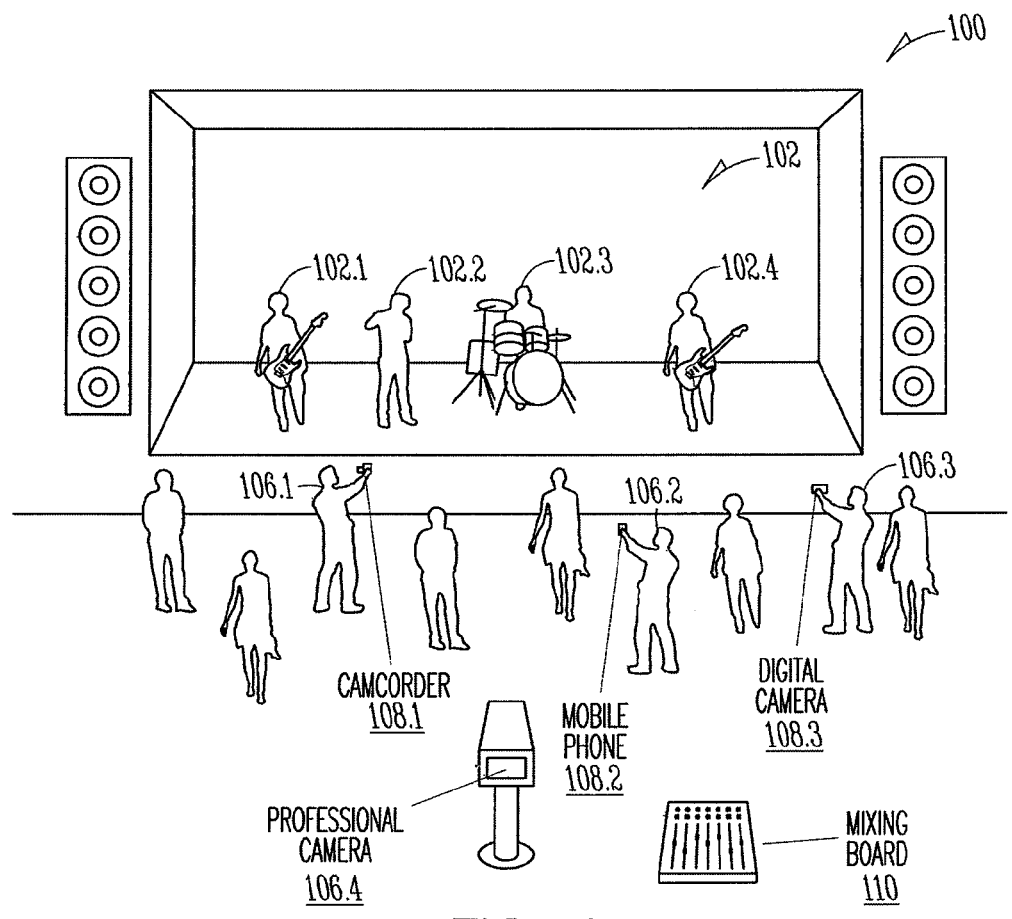
FIG. 1 illustrates a hypothetical concert with a band playing on a stage including several audience members making their own recordings and a professional camera recording the entire stage.

The following description and the drawings sufficiently illustrate example embodiments to enable those skilled in the art to practice them. Other example embodiments may incorporate structural, logical, electrical, process, and other changes. Examples merely typify possible variations. Individual components and functions are optional unless explicitly required, and the sequence of operations may vary. Portions and features of some example embodiments may be included in, or substituted for those of other example embodiments. Example embodiments set forth in the claims encompass all available equivalents of those claims.

One of the current trends that can be observed with artists interacting with their fans is to ask fans to submit footage that they have filmed during a concert for later use by professional editors in concert videos. One example for this is a recent appeal issued by a performance act to their fans to film an event in New York City and provide the material later. This can be seen as a reaction by the artists to the more and more frequent usage of filming equipment such as mobile phones or pocket cameras during shows and the futility of trying to quench this trend by prohibiting any photo equipment.

Some example embodiments may provide the technical apparatus and/or system to automatically synchronize multiple video clips taken from the same event, and by enabling a consumer to create his or her own personal concert recording by having access to a manifold of video clips, including the ability to add own, personal material. This makes use of the fact that many people carry equipment with them in their daily life that is capable of capturing short media or multimedia clips (photo, video, audio, text), and will use this equipment during events or shows to obtain a personal souvenir of the experience. Many people are willing to share content that they have created themselves. This sharing of content is not restricted to posting filmed media clips, but includes assembling media clips in an artistic and individual way. To leverage these observed trends, some example embodiments use media fingerprinting to identify and synchronize media clips.

In some example embodiments, the media synchronization system may be used to synthesize a complete presentation of an event from individual, separately recorded views of the event. An example of this is to synthesize a complete video of a concert from short clips recorded by many different people in the audience, each located in a different part of the performance hall, and each recording at different times. In these example embodiments, there may be sufficient overlap between the individual clips that the complete concert can be presented. In some example embodiments, concert attendees may take on the role of camera operators, and the user of the system may take on the role of the director in producing a concert video. In some example embodiments, technologies such as audio fingerprinting and data mining are used to automatically detect, group, and align clips from the same event.

While some example embodiment may be used with public events like concerts, these example embodiments may also be used with private and semi-private events like sports and parties. For example, a group of kids may each record another kid doing tricks on a skateboard. Later, those separate recordings could be stitched together in any number of different ways to create a complete skate video, which could then be shared. Just as personal computers became more valuable when email became ubiquitous, video recording devices like cameras and phones will become more valuable when effortless sharing and assembly of recorded clips becomes possible. Some example embodiments may play a key role in this as storage and facilitator of said content assembly.

Some example embodiments may be used by moviemakers who enjoy recording events and editing and assembling their clips, along with those of other moviemakers, into personalized videos, which they then share. Some example embodiments may be used by movie viewers who enjoy watching what the moviemakers produce, commenting on them, and sharing them with friends. Both groups are populated with Internet enthusiasts who enjoy using their computers for creativity and entertainment. Some example embodiments may be used by the event performers themselves who may sanction the recordings and could provide high-quality, professionally produced clips for amateurs to use and enhance, all in an effort to promote and generate interest in and awareness of their performance.

Some example embodiments may be used for recording concerts and allowing fans to create self-directed movies using clips recorded professionally and by other fans.

FIG. 1 illustrates a hypothetical concert 100 with a band 102 playing on a stage 104, with several audience members 106.1-106.3 making their own recordings with their image capture devices 108.1-108.3, for example, cameras (e.g., point and shoot cameras) and phone cameras, and with a professional camera 106.4 recording the entire stage 104. A main mixing board 110 may be provided to record the audio for the concert 100. The professional camera 106.1 may capture the entire stage 104 at all times while the fan cameras 108.1-108.3 may capture individual performers 102.1-102.4, or the non-stage areas of the performance space like the audience and hall, or provide alternate angles, or move about the performance space.

Figure 2:
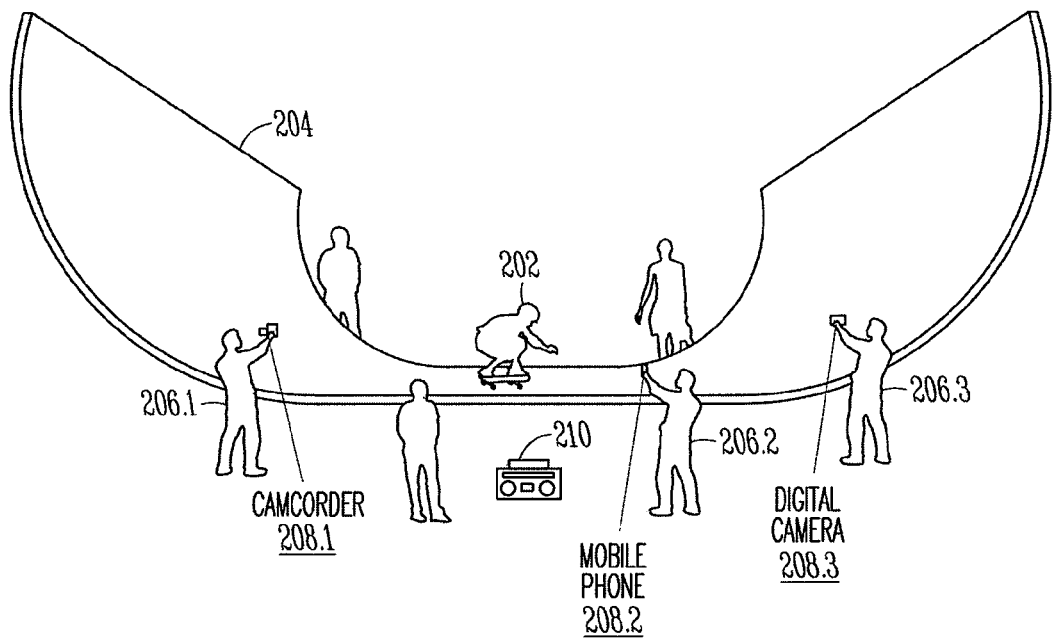
FIG. 2 illustrates one person riding a skateboard through a course while his friends film him with their cameras and phones.

Some example embodiments may be suitable for use with public events like concerts, and may also be used for private and semi-private events like kids doing tricks on skateboards. For example, FIG. 2 illustrates one person 202 riding a skateboard through a course 204 while his friends 206.1-206.3 film him with their image capture devices, for example, cameras (e.g., point and shoot cameras) and phone cameras 208.1-208.3. There may be a stereo 210 playing music to, inter alia, set the mood. In these example embodiments, the clips captured by the cameras 208.1-208.3 may be pooled, synchronized, and edited into a good-looking movie, for example, that may be shared on the Internet.

In one example embodiment, as the skater moves past a camera, that camera's footage may be included in the final movie. Because the cameras may also record audio, each camera 208.1-208.3 may simultaneously record the same music played by the stereo (or any other audio equipment playing music at the event). Accordingly, in an example embodiment, audio fingerprinting is used to synchronize the clips without the need for conventional synchronization (e.g., synchronizing video based on related frames). In these example embodiments, the content itself may drive the synchronization process. When no music is playing during recording, some example embodiments may synchronize the clips using other audio provided the audio was sufficiently loud and varying to allow for reasonable quality audio fingerprints to be computed, although the scope of the disclosure is not limited in this respect. For the purposes of this disclosure, an audio fingerprint includes any acoustic or audio identifier that is derived from the audio itself (e.g., from the audio waveform).

Figure 3:
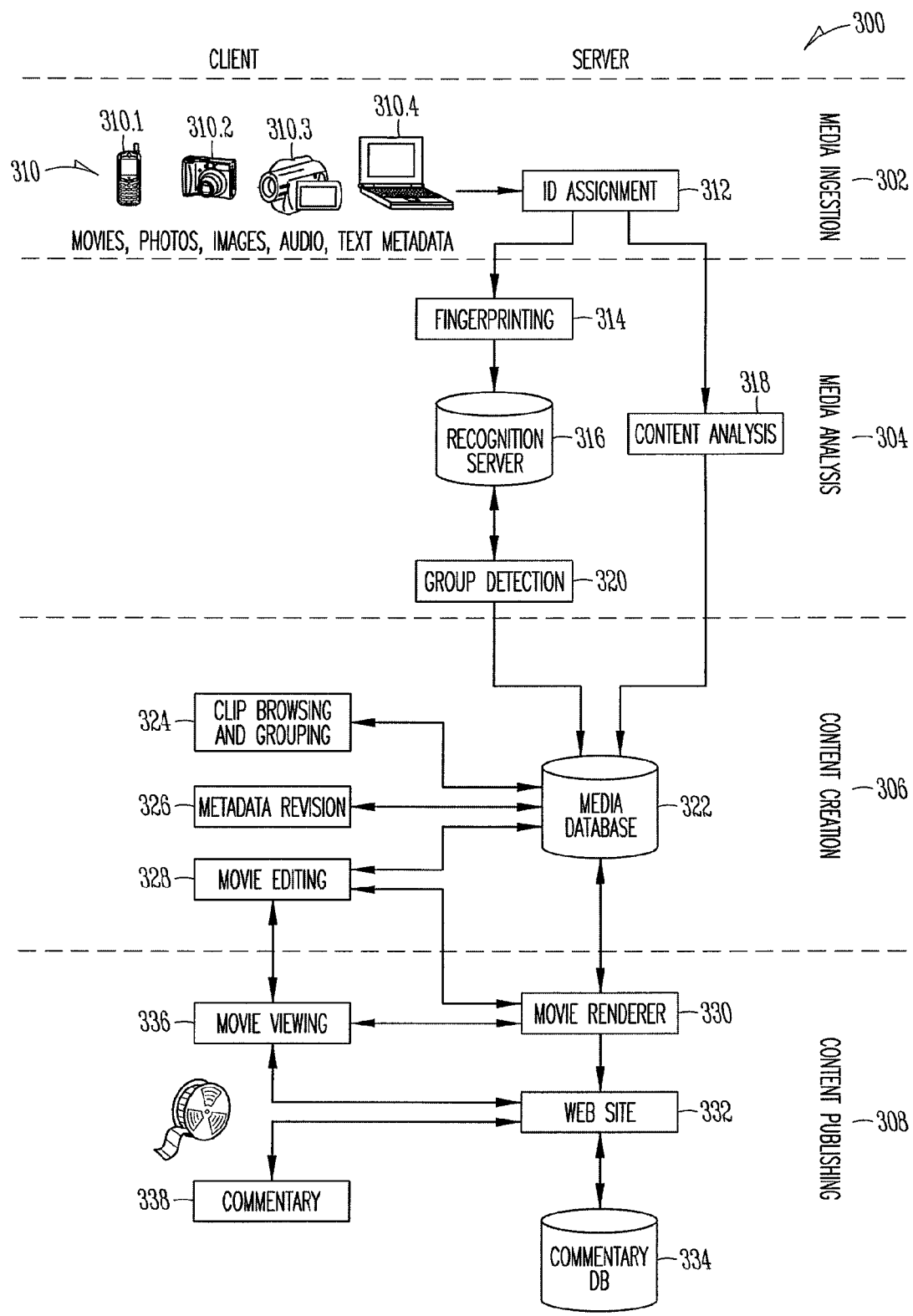
FIG. 3 is a functional diagram of a media synchronization system in accordance with some example embodiments.

FIG. 3 is a functional diagram of a media synchronization system 300 in accordance with some example embodiments. In FIG. 3, four example primary components of the media synchronization system 300 are illustrated. These example components may include, but are not limited to, a media ingestion component or module 302, a media analysis component or module 304, a content creation component or module 306, and a content publishing component or module 308. While it may be logical to process captured media sequentially from the media ingestion module 302 to the content publishing module 308, this is not a requirement as a user likely may jump between the components many times as he or she produces a finished movie. The following description describes some example embodiments that utilize client-server architecture. However, the scope of the disclosure is not limited in this respect as other alternative architectures may be used.

In accordance with some example embodiments, the media ingestion module 302 of the media synchronization system 300 may be used to bring source clips into the system 300, and to tag each clip with metadata to facilitate subsequent operations on those clips. The source clips may originate from consumer or professional media generation devices 310, including: a cellular telephone 310.1, a camera 310.2, a video camcorder 310.3, and/or a personal computer (PC) 310.4. Each user who submits content may be assigned an identity (ID). Users may upload their movie clips to a ID assignment server 312, attaching metadata to the clips as they upload them, or later as desired. This metadata may, for example, include the following:

Event Metadata:
Name (e.g., U2 concert)
Subject (e.g., Bono)
Location (e.g., Superdome, New Orleans)
Date (e.g., 12/31/08)
Specific seat number or general location in the venue (e.g., section 118, row 5, seat 9)
Geographic coordinates (e.g., 29.95 IN 90.081W)
General Comments (e. g., Hurricane Benefit, with a particular actor)
Technical Metadata:
User ID
Timestamp
Camera settings
Camera identification
Encoding format
Encoding bit rate
Frame rate
Resolution
Aspect ratio
Cinematic Metadata:
Camera location in the event venue (e.g., back row, stage left, etc.)
Camera angle (e.g., close up, wide angle, low, high, etc.)
Camera technique (e.g., Dutch angle, star trek/batman style), handheld, tripod, moving, etc.)
Camera motion (e.g., moving left/right/up/down, zooming in or out, turning left/right/up/down, rotating clockwise or counter-clockwise, etc.)
Lighting (e.g., bright, dark, back, front, side, colored, etc.)
Audio time offset relative to video
Community Metadata:
Keywords
Ratings (e.g., audio quality, video quality, camerawork, clarity, brightness, etc.)

Upon arrival at the ID assignment server 312, a media ID may be assigned and the media may be stored in a database along with its metadata. At a later time, for example, users may review, add, and change the non-technical metadata associated with each clip.

While clips from amateurs may make up the bulk of submissions, in some example embodiments, audio and video clips recorded professionally by the performers, their hosting venue, and/or commercial media personnel may be used to form the backbone of a finished movie. In these example embodiments, these clips may become the reference audio and/or video on top of which all the amateur clips are layered, and may be labeled as such. In some example embodiments, reference audio may be provided directly off the soundboard (e.g., the main mixing board 108 shown in FIG. 1) and may represent the mix played through the public address (PA) system at a concert venue. In certain embodiments, individual instruments or performers provide the reference audio. In some example embodiments, reference video may be provided from a high-quality, stable camera that captures the entire stage, or from additional cameras located throughout the venue and operated by professionals (e.g., the professional camera 106.4).

While several example embodiments are directed to the assembly of video clips into a larger movie, some example embodiments may be used to assemble still photos, graphics, and screens of text and any other visuals. In these example embodiments, still photos, graphics, and text may be uploaded and analyzed (and optionally fingerprinted) just like movie clips. Although these example embodiments may not need to use the synchronization features of the system 300, pure audio clips could be uploaded also. These example embodiments may be useful for alternate or higher-quality background music, sound effects, and/or voice-overs, although the scope of the disclosure is not limited in this respect.

In accordance with some example embodiments, the media analysis module 304 of the media synchronization system 300 may be used to discover how each clip relates to one or more other clips in a collection of clips, for example, relating to an event. After ingestion of the media into the system 300, clips may be transcoded into a standard format, such as Adobe Flash format. Fingerprints for each clip may be computed by a fingerprinting sub-module 314 and added to a recognition server 316. In some embodiments, the recognition server includes a database. The primary fingerprints may be computed from the audio track, although video fingerprints may also be collected, depending on the likelihood of future uses for them.

In some example embodiments, additional processing may be applied as well (e.g., by the recognition server 316 and/or the content analysis sub-module 318). Examples of such additional processing may include, but are not limited to, the following:

Face, instrument, or other image or sound recognition;
Image analysis for bulk features like brightness, contrast, color histogram, motion level, edge level, sharpness, etc.;
Measurement of (and possible compensation for) camera motion and shake;
Tempo estimation;
Event onset detection and synchronization;
Melody, harmony, and musical key detection (possibly to join clips from different concerts from the same tour, for instance);
Drum transcription;
Audio signal level and energy envelope;
Image and audio quality detection to recommend some clips over others (qualities may include noise level, resolution, sample/frame rate, etc.);
Image and audio similarity measurement to recommend some clips over others (features to analyze may include color histogram, spectrum, mood, genre, edge level, motion level, detail level, musical key, etc.);
Beat detection software to synchronize clips to the beat;
Image interpolation software to synchronize clips or still images (by deriving a 3-D model of the performance from individual video clips, and a master reference video, arbitrary views may be interpolated, matched, and synchronized to other clips or still images); or
Speech recognition.

After initial processing, the fingerprints for a clip may be queried against the internal recognition server to look for matches against other clips. If a clip overlaps with any others, the nature of the overlap may be stored in a database for later usage. The system 300 may be configured to ignore matches of the clip to itself, regardless of how many copies of the clip have been previously uploaded.

In some example embodiments, the system 300 may maintain a "blacklist" of fingerprints of unauthorized media to block certain submissions. This blocking may occur during initial analysis, or after the fact, especially as new additions to the blacklist arrive.

In an example embodiment, a group detection module 320 is provided. Accordingly, clips that overlap may be merged into groups. For example, if clip A overlaps clip B, and clip B overlaps clip C, then clips A, B, and C belong in the same group. Suppose there is also a group containing clips E, F, and G. If a new clip D overlaps both C and E, then the two groups may be combined with clip D to form a larger group A, B, C, D, E, F, and G.

Although many overlaps may be detected automatically through fingerprint matching, there may be times when either fingerprint matching may fail or there is no clip (like D in the example above) that bridges two groups has been uploaded into the system 300. In this case, other techniques may be used to form a group. Such techniques may include analysis of clip metadata, or looking for matches on or proximity in, for example:

Event name and date;
Event location;
Clip timestamp;
Clip filename;
Submitter user ID;
Camera footprint;
Chord progression or melody; or
Image similarity.

In an example embodiment, clips that do not overlap anything may be included in the group. Such clips include establishing shots of the outside of the venue, people waiting in line or talking about the performance, shots to establish mood or tone, and other non-performance activity like shots of the crowd, vendors, set-up, etc. These clips may belong to many groups.

In some example embodiments, the system 300 may be configured to allow users to indicate which groups to merge. Since not all users may group clips in the same way, care may be taken to support multiple simultaneous taxonomies.

For example, clips associated with the same submitter user ID and/or camera footprint may be grouped together. The temporal offset of one clip from that camera for a given event (relative to other clips or a reference time base) may then be applied to all clips in the group. This temporal offset may also be applied to still images from that camera.

In some example embodiments, the system 300 may be configured to allow users of the system 300 who all upload clips from the same event to form a group for collaboration, communication, and/or criticism. Automatic messages (e.g., email, SMS, etc.) may be generated to notify other group members if new clips are uploaded, or a finished movie is published.

In some example embodiments, the system 300 may be configured to automatically detect, inter alia, the lead instrument, primary performer, or player focus. While this may be accomplished through image or sound recognition, an alternative heuristic is to notice that, for example, more footage may be available for the guitarist during the solo passage. In these example embodiments, when a lot of footage is available for a scene, it may indicate that the scene may be a solo scene or other focus of the performance, and most media generation devices 310 may be focused on the soloist or primary performer at that moment.

In some example embodiments, the content creation module 306 of the system 300 is used to build a finished movie from source clips contained in a media database 322. In various example embodiments, after upload and analysis, the user may select clips to include in the final movie. This may be done by a clip browsing and grouping sub-module 324 that allows a user to select clips from among clips uploaded by the user, clips uploaded by other users, and/or clips identified through user-initiated text metadata searches. A metadata revision sub-module 326 allows the user to edit the metadata of a clip. In some embodiments, the media database 322 contains references (e.g., pointers, hyperlinks, and/or uniform resource locators (URLs)) to clips stored outside the system 300. If the selected clips are part of any group of clips, the clip browsing and grouping sub-module 324 may include the other clips in the group in providing the user with a working set of clips that the user may then assemble into a complete movie. As the movie is built, the movie (or a portion of it) may be previewed to assess its current state and determine what work remains to be done. For example, a graphical user interface may be provided by a web interface to allow a user to access and manipulate clips. User involvement, however, is not absolutely necessary, and certain embodiments may build a finished movie automatically (e.g., without user supervision).

In some example embodiments, movie editing tools and features may be provided in a movie editing sub-module 328. Movie editing tools and features include one or more of the following:

Simple cuts;
Multitrack audio mixing;
Audio fade in and out;
Video fade in and out;
Audio crossfading;
Video dissolving;
Wipes and masking;
Picture-in-picture;
Ducking (automatically lowering other audio during a voice-over or for crowd noise);
Titles and text overlays;
Chromakeyed image and video overlays and underlays;
Video speed-up, slow-motion, and freeze-frame;
Audio and video time stretching and shrinking;
Video and audio dynamic range compression;
Video brightness, contrast, and color adjustment;
Color to black & white or sepia conversion;
Audio equalization;
Audio effects like reverberation, echo, flange, distortion, etc.;
Audio and video noise reduction;
Multichannel audio mastering (e.g., mono, stereo, 5.1, etc.);
Synchronized image interpolation between two or more cameras for its own sake (morphing) or to simulate camera motion;
"Matrix"-style effects; and/or
Subtitles and text crawls.

Because some example embodiments include a basic video editor, there may be essentially no limit to the number of features that may be made available in a user interface (e.g., a web-based user interface). Any available video editing technique or special effect may be integrated into the system 300.

In some example embodiments, the content creation module 306 of the system 300 may be implemented as a web application, accessed through a browser. Since people may be reluctant to install software, a web-based tool may allow for a wider audience, not just due to the cross-platform nature of web applications, but due to the fact that visitors may quickly begin using it, rather than downloading, installing, and configuring software. A web application may also be easier to maintain and administer, since platform variability is significantly reduced versus PC-based applications, although the scope of the disclosure is not limited in this respect.

Web-based video editing may place great demands on network bandwidth and server speed. Therefore, some example embodiments of the content creation module 306 may be implemented on a PC, however the scope of the disclosure is not limited in this respect as embedded devices such as mp3 players, portable game consoles, and mobile phones become more capable of multimedia operations, and network bandwidth increases, these platforms become more likely the target for the user interface.

In some example embodiments, the media analysis module 304 and/or the content creation module 306 may be implemented, in part or entirely, on a server or on a client device. A central storage server connected to the Internet or a peer-to-peer network architecture may serve as the repository for the user generated clips. A central server system, an intermediary system (such as the end user's PC) or the client system (such as the end user's mobile phone) may be a distributed computational platform for the analysis, editing, and assembly of the clips.

In some example embodiments, all the movie synthesis may occur on the server and only a simple user interface may be provided on the client. In these example embodiments, non-PC devices like advanced mobile phones may become possible user platforms for utilization of these example embodiments. These example embodiments may be particularly valuable since these devices are generally capable of recording the very clips that the system 300 may assemble into a movie.

A feature that spans both the content creation module 306 and the content publishing module 308 would be the generation of "credits" at the end of the finished movie. These may name the director and also others who contributed clips to the final movie. In some example embodiments, the system 300 may be configured to automatically generate or manually add these credits. In some example embodiments, the credits may automatically scroll, run as a slide show, or be totally user-controlled.

The content publishing module 308 of the media synchronization system 300 of FIG. 3 may be used to share a finished movie with the world. A movie renderer 330 generates the finished movie. When the movie is complete, the user may publish it on the system's web site 332, publish it to another video sharing site, and/or use it as a clip for another movie. Sharing features, such as RSS feeds, distribution mailing lists, user groups, may be provided. Visitors may allowed to leave comments on the movies they watch, email links to them to friends, embed the movies in their blogs and personal web pages, submit the movie's permalink to shared bookmark and ratings sites. Commentary 338, transactions, click counts, ratings, and other metadata associated with the finished movie may be stored in a commentary database 334. To respect privacy, some clips and finished movies may be marked private or semi-private, and users may be able to restrict who is allowed to watch their movies. A movie viewing sub-module 336 may display the finished movie and offer access to movie editing tools 328.

In some example embodiments, future users may continue where earlier users left off, creating revisions and building on each other's work. While others may derive from one user's movie, only the original creator of a movie may make changes to the original movie. In an example embodiment, all other users work only on copies that develop separately from the original. A basic version control system is optionally provided to facilitate an "undo" feature and to allow others to view the development of a movie.

Because various example embodiments of the system 300 may control the movie creation process and store the source clips, to save space, rarely watched finished movies may be deleted and recreated on-the-fly should someone want to watch one in the future. In addition, while common videos may be edited and displayed at moderate and economical bit rates, premium versions may be automatically generated from the source clips at the highest quality possible, relative to the source clips.

If suitable business arrangements may be made, source clips may be pulled from, and finished movies published to, one or more popular video sharing sites. Alternatively, one or more of the example embodiments described herein may be incorporated directly into web sites as a new feature, although the scope of the disclosure is not limited in this respect.

Some example embodiments may provide plug-ins that include features of the system 300 for popular (and more powerful) video editing systems, so that people may use their preferred editors but work with clips supplied by the example system 300. In this example scenario, the synchronization information that the system 300 automatically determines may be associated with the clips as metadata for future use by other editing systems.

Example embodiments may be used for the creation of composite mash-up videos, which is done by the moviemakers. Example embodiments may also be used for the consumption of the videos created in the first application, which is done by the movie watchers.

Example embodiments may be used to create composite mash-up videos for the following events, and many more. Essentially any event where people are often seen camera-in-hand would make a great subject for a video created using example embodiments. Events include the following:

Large-scale concerts;
Small-scale club gigs;
Dancing and special events at nightclubs;
Parties;
Religious ceremonies:
    Weddings,
    Baptisms,
    Bar/Bat Mitzvahs;
Amateur and professional sports:
    Skateboarding,
    Snowboarding,
    Skiing,
    Soccer,
    Basketball,
    Racing,
    Other sports;
Amusement park attractions:
    Animal performances,
    Human performances,
    Rides;
Parades;
Street performances;
Circuses:
    Acrobats,
    Magicians,
    Animals,
    Clowns;
School and extracurricular events:
    Dance recitals,
    School plays,
    Graduations;
Holiday traditions; and/or
Newsworthy events:
    Political rallies,
    Strikes,
    Demonstrations,
    Protests.

Some reasons to create a video with aid of the system may include:
Pure creativity and enjoyment;
Sharing;
Sales;
Mash-up video contests;
Fan-submitted remixes and parodies;
Promotion and awareness-raising;
Multi-user-generated on-site news reporting; and/or
Documenting flash mobs.

Contests and other incentives may be created to generate interest and content.

Videos created using example embodiments may be enjoyed through many channels, such as:
The system site itself;
Video sharing sites;
Social networking sites;
Mobile phones;
Performing artist fan sites;
Schools;
Personal web pages;
Blogs;
News and entertainment sites;
Email;
RSS syndication;
Broadcast and cable television; and/or
Set-top boxes.

Since the operating service controls the delivery of the movie content, advertisements may be added to the video stream to generate revenue. Rights holders for the clips may receive a portion of this income stream as necessary.

In some example embodiments, the four primary components of the system may be distributed arbitrarily across any number of different machines, depending on the intended audience and practical concerns like minimizing cost, computation, or data transmission. Some example system architectures are described below, and some of the differences are summarized in the Table 1. In Table 1, each operation may correspond to one illustrated in FIG. 3.

| | Architecture | | | |
|---|---|---|---|---|
| Operation | Single Machine | Client-Centric | Server-Centric | Peer-To-Peer |
| ID Assignment | User's PC | Server | Server | Server |
| Fingerprinting | User's PC | User's PC | Server | Distributed |
| Clip Recognition | User's PC | Server | Server | Distributed |
| Group Detection | User's PC | Server | Server | Distributed |
| Content Analysis | User's PC | User's PC | Server | Distributed |
| Clip Browsing and Grouping | User's PC | User's PC | User's PC | User's PC |
| Metadata Revision | User's PC | User's PC | User's PC | User's PC |
| Movie Editing | User's PC | User's PC | User's PC | User's PC |
| Media Database | User's PC | Server | Server | Distributed |
| Movie Viewing | User's PC | User's PC | User's PC | User's PC |
| Movie Rendering | User's PC | User's PC | Server | Distributed |
| Web Site | N/A | Server | Server | Server |
| Commentary DB | N/A | Server | Server | Server |
| Commentary | N/A | User's PC | User's PC | User's PC |

Figure 6:
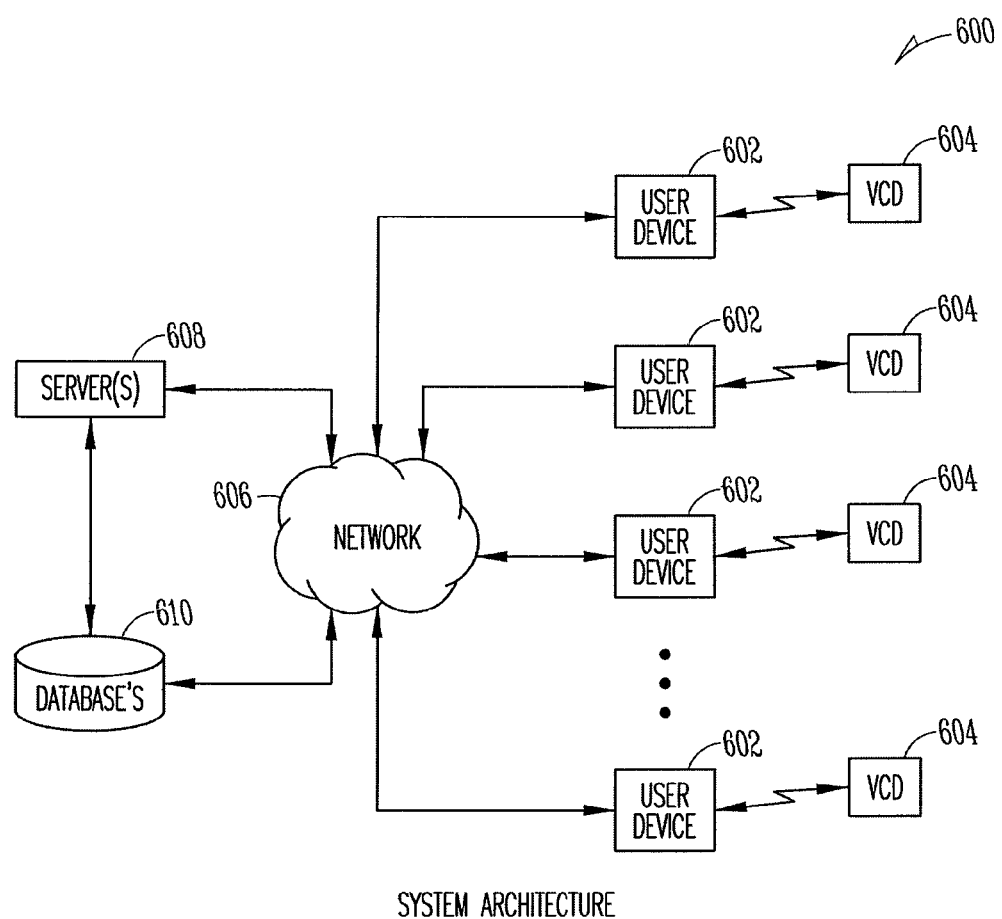
FIG. 6 illustrates an example system architecture in accordance with some example embodiments.

Although the table describes hard lines drawn between the architectures, the scope of the disclosure is not limited in this respect as actual implementations may comprise a mix of elements from one or more architectures. FIG. 6, described in more detail below, illustrates an example of a system architecture.

Some example embodiments may be configured to run entirely on a single client machine. However, a single user may not have enough overlapping video to make use of the system's automatic synchronization features. Specialized users, like groups of friends or members of an organization may pool their clips on a central workstation on which they would produce their movie. The final movie may be uploaded to a web site, emailed to others, or burned to DVD or other physical media.

In some example embodiments, a client-centric implementation may push as much work to the client as possible. In these example embodiments, the server may have minimal functionality, including:
- a repository of media clips that client machines draw from and that may be displayed on a web site;
- a fingerprint matching service to detect clip overlap; and/or
- a central authority for assigning unique IDs to individual clips.

The client may handle everything else, including:
- fingerprinting;
- content analysis;
- video editing UI;
- video and audio processing; and/or
- final movie rendering.

These example embodiments may be scaled to handle very large numbers of simultaneous users easily.

In other example embodiments, a server-centric implementation may rely on server machines to handle as much work as possible. The client may have minimal functionality, for example, including:
- data entry;
- movie editing tool(s); and/or
- movie viewing.

The server may perform most everything else, for example:
- fingerprinting;
- content analysis;
- video and audio processing; and/or
- final movie rendering.

A potential advantage of these example embodiments is that control over the functionality and performance is centralized at the server. Faster hardware, faster software, or new features may be deployed behind the scenes as the need arises without requiring updates to client software. If the client is web-based, even the look, feel, and features of the client user interface may be controlled by the server. Another potential advantage is that the user's system may be extremely low-powered: a mobile phone, tablet PC, or set-top box might be sufficient.

In some example embodiments, a distributed architecture may be provided in which there is no central storage of media clips. In these example embodiments, source clips may be stored across the client machines of each member of the user community. Unless they may be implemented in a distributed fashion as well, in an example embodiment there may be a central database mapping clip IDs to host machines, and a centralized fingerprint recognition server to detect clip overlap. Like the client centric example embodiments, in these distributed example embodiments, the client may implement all signal processing and video editing. Finished movies may be hosted by the client as well. To enhance availability, clips and finished movies may be stored on multiple machines in case individual users are offline.

A potential advantage of these distributed example embodiments is that the host company needs a potentially minimal investment in hardware, although that would increase if a central clip registry or fingerprint recognition server would need to be maintained.

Figure 4:
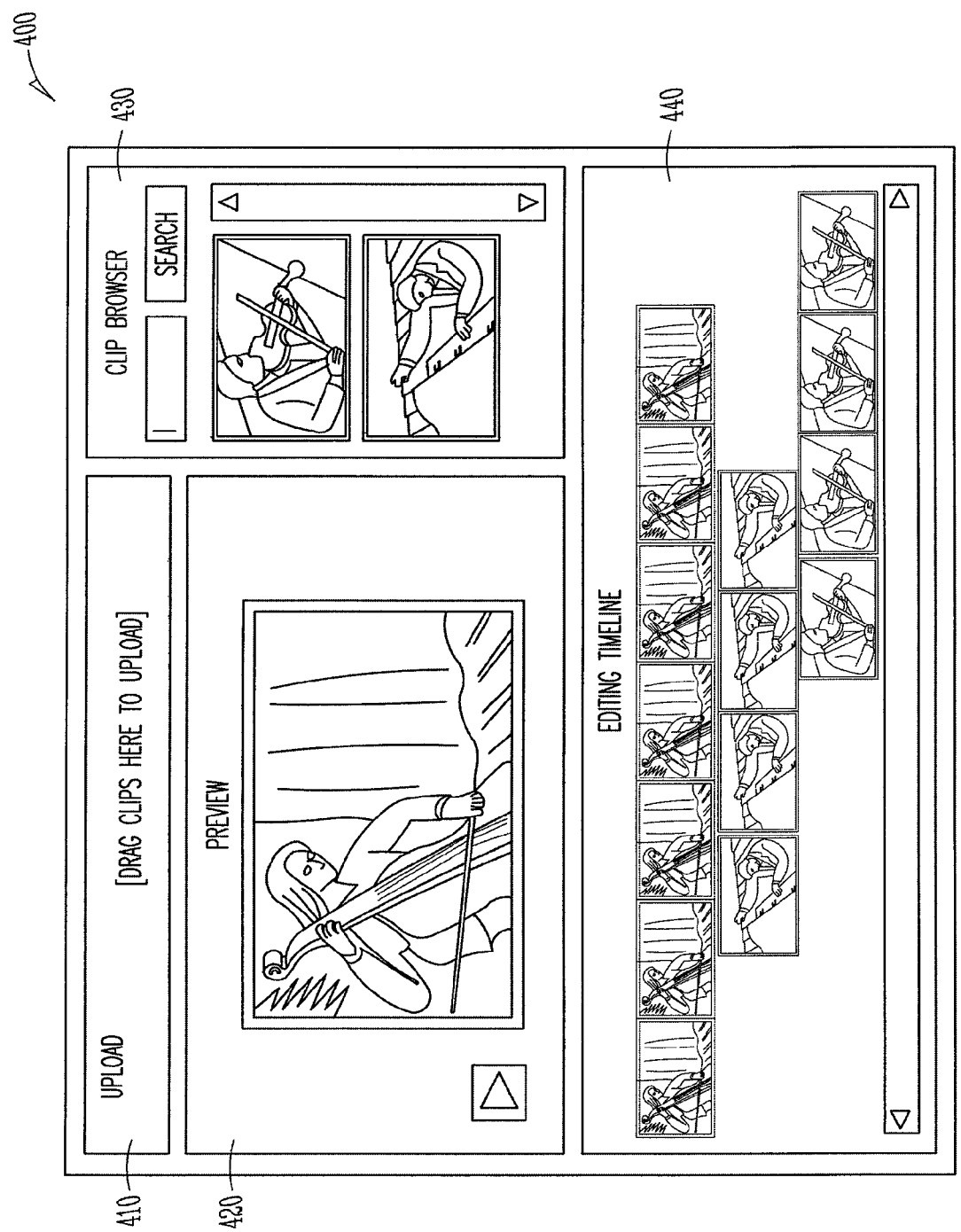
FIG. 4 illustrates an example of a user interface in accordance with an example embodiment.

FIG. 4 illustrates an example movie editing user interface in which media clips may be positioned relative to each other on a timeline, as determined by their temporal overlap. For example, where a user is editing a movie of a concert, media clips may be aligned in a manner that that will preserve the continuity of the music, despite multiple cuts among different scenes and/or camera angles, when the finished movie is presented. In another example, where a user is editing a movie of a lecture, media clips may be aligned in a manner that will preserve the continuity of the lecturer's speech, despite multiple cuts among different scenes and/or camera angles, when the finished movie is presented. In yet another example, where a user is editing a movie of a crime scene, media clips may be aligned in a manner that will preserve the continuity of time code (e.g., local time) from one or more security cameras, despite multiple cuts among different scenes and/or camera angles, when the finished movie is presented. In other example embodiments, alignment of audio and/or text data may be based upon video fingerprinting.

Users may be free to adjust this alignment, but they may also rely on it to create well-synchronized video on top of a seamless audio track or time code track. Also, since fingerprint-derived match positions may not be accurate to the millisecond, some adjustment may be necessary to help ensure that the beat phase remains consistent. Due to the differing speeds of light and sound, video of a stage captured from the back of a large hall might lead the audio by a noticeable amount. Some example embodiments may compensate for these differing speeds of light and sound. In some example embodiments, on a clip where the video and audio are out of synchronization, an offset value may be associated with the clip to make the clip work better in assembled presentations (e.g., movies).

Like most professionally produced movies, the image and sound need not be from the same clip at the same time. In some example embodiments, the system 300 may be configured to present audio without the corresponding image for a few seconds, for instance, to create a more appealing transition between scenes. Alternatively, some example embodiments of the system 300 may be configured to drop a sequence of video-only clips in the middle of a long audio/video clip. Some example embodiments of the system 300 may also be configured to mix in sounds of the hall or the crowd along with any reference audio that might be present.

Different devices may record the audio with different levels of fidelity. To avoid distracting jumps in audio quality, and for general editing freedom, an example embodiment allows cross-fading between audio from multiple clips. In an example embodiment, the system 300 may be configured to use a reference audio track, if available. Analogous video effects, like dissolves, are provided in an example embodiment. In some example embodiments, the system 300 includes logic that judges audio and video by duration and quality, and recommends the best trade-off between those two parameters. In some example embodiments, the system 300 may be configured to allow users to assign ratings to the quality of a clip.

Because it may be quite likely that there may be gaps in the coverage of an event, the system 300 may be configured to provide pre-produced (e.g., canned) effects, wipes, transitions, and bumpers to help reduce or minimize the disruption caused by the gaps, and ideally make them appear to be deliberate edits of the event, and not coverings for missing data.

Some example embodiments may provide a user interface to allow clips to be dragged to an upload area 410 upon which they are transmitted to a central server and processed further. In these example embodiments, as clips are uploaded a dialog box may be displayed to allow metadata to be entered. Clips may then be searched for in a clip browser 430. Clips discovered in the browser may be dragged to an editing timeline 440. If a newly dragged clip overlaps with other clips in the timeline, the system 300 may automatically position the new clip to be synchronized with existing clips. Some example embodiments allow users to manipulate the editing timeline to choose which clip is displayed at any point in the final movie, and/or to apply special effects and other editing techniques. As the final movie is edited, the user interface may allow its current state to be viewed in a preview window 420. In some example embodiments, at any time a clip may be opened to revise its associated metadata.

Figure 5:
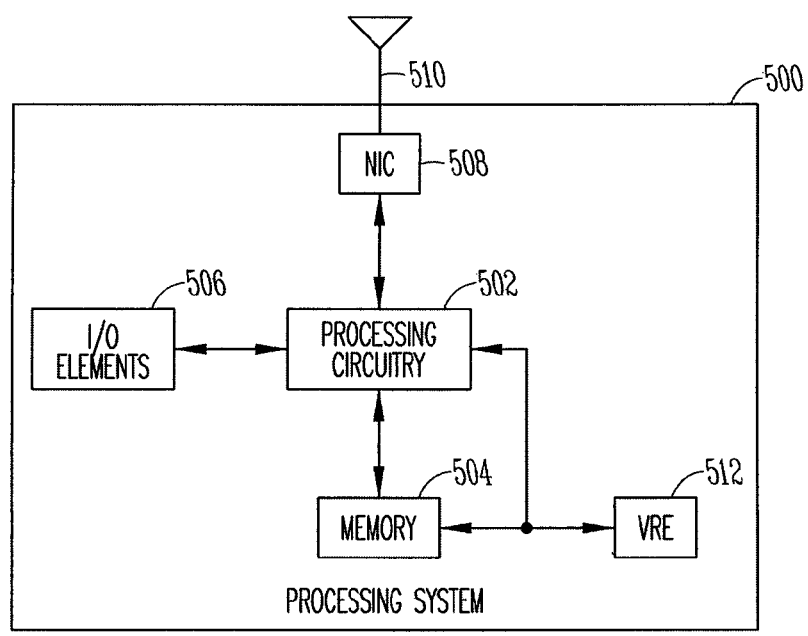
FIG. 5 is a block diagram of a processing system suitable for implementing one or more example embodiments.

FIG. 5 is a block diagram of a processing system 500 suitable for implementing one or more example embodiments. The processing system 500 may be almost any processing system, such as a personal computer or server, or a communication system including a wireless communication device or system. The processing system 500 may be suitable for use as any one or more of the servers or client devices (e.g., PCs) described above that is used to implement some example embodiments, as well as any one or more of the client devices, including wireless devices, that may be used to acquire and video and audio. The processing system 500 is shown by way of example to include processing circuitry 502, memory 504, Input/Output (I/O) elements 506 and network interface circuitry 508. The processing circuitry 502 may include almost any type of processing circuitry that utilizes a memory, and may include one or more digital signal processors (DSPs), one or more microprocessors and/or one or more micro-controllers. The memory 504 may support processing circuitry 502 and may provide a cache memory for the processing circuitry 502. I/O elements 506 may support the input and output requirements of the system 500 and may include one or more I/O elements such as a keyboard, a keypad, a speaker, a microphone, a video capture device, a display, and one or more communication ports. A NIC 508 may be used for communicating with other devices over wired networks, such as the Internet, or wireless networks using an antenna 510. In some example embodiments, when the processing system 500 is used to capture video and audio and operations as a video capture device, the processing system 500 may include one or more video recording elements (VRE) 512 to record and/or store video and audio in a high quality format.

Examples of wireless devices may include personal digital assistants (PDAs), laptop and portable computers with wireless communication capability, web tablets, wireless telephones, wireless headsets, pagers, instant messaging devices, MP3 players, digital cameras, and other devices that may receive and/or transmit information wirelessly.

FIG. 6 illustrates an example system architecture in accordance with some example embodiments. The system architecture 600 may be suitable to implement one or more or the example architectures described above in Table 1. The system architecture 600 includes one or more user devices 602 which may be used to receive video and other information from the video capture devices (VCDs) 604. The VCDs 604 may include any device used to capture video information. A user device 602 may communicate with other user devices 602 as well as one or more servers 608 and one or more databases 610 over a network 606. In some example embodiments, the databases 610 may include the media database discussed above and/or the commentary database discussed above, although the scope of the disclosure is not limited in this respect as theses databases may be stored on one or more of the user devices 602. The servers 608 may include, among other things, the recognition server 316 discussed above as well as server equipment to support the various operations of the system 300 discussed by way of example above, although the scope of the disclosure is not limited in this respect as theses operations may be stored on one or more of the user devices 602. The processing system 500 may be suitable for use to implement the user devices 602, the VCDs 604 and/or the servers 608. The user devices 602 may correspond to user's PC, described above.

In some example embodiments, consumers/multiple users may contribute multimedia material (video, audio, image, text . . . ) to a common repository/pool (e.g. a specific web site, or in a P2P environment to a specific pool of end user computers), and the method and system of these embodiments may then take the media clips and automatically align them, either spatially or temporarily, using clues within the submitted media or from a reference media. The aligned media clips can then be selected, edited and arranged by consumers/multiple users to create an individual media experience, much like an artistic collage.

Although the example system architecture 600 and the system 300 are illustrated by way of example as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some example embodiments, the functional elements of the system may refer to one or more processes operating on one or more processing elements.

Figure 7:
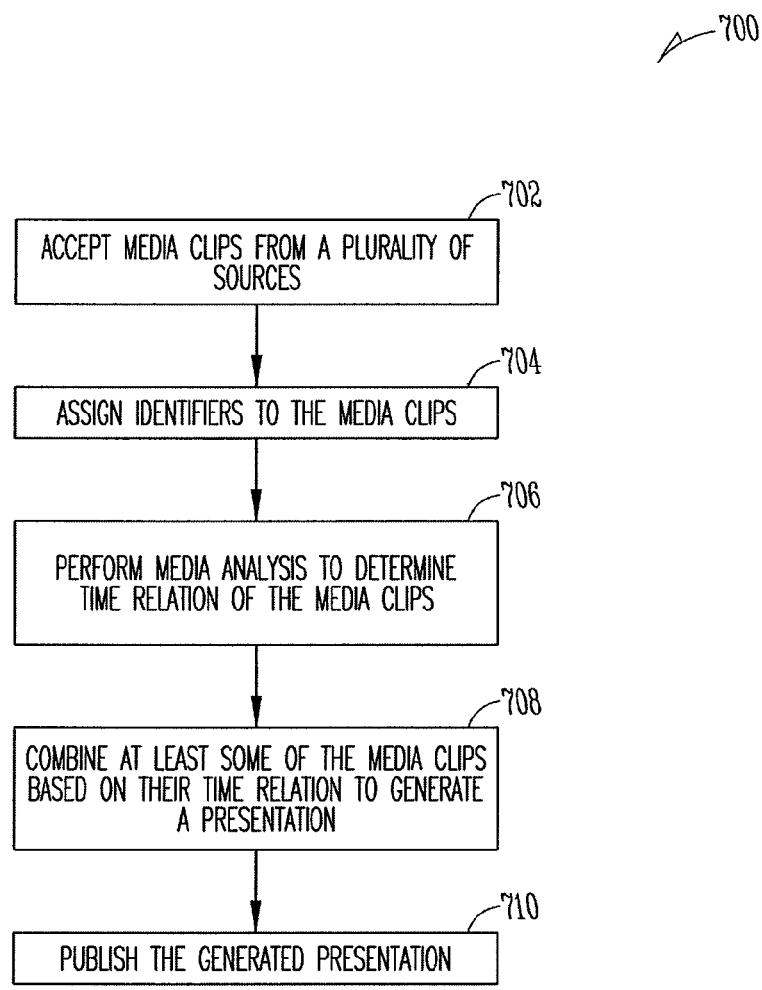
FIG. 7 is a flow chart of a procedure for synthesizing a multimedia event in accordance with some example embodiments.

FIG. 7 is a flow chart of a method 700 for synthesizing a multimedia event in accordance with some example embodiments. The operations of method 700 may be performed by one or more user devices 602 (see FIG. 6) and/or servers 608 (see FIG. 6). Operation 702 includes accessing media clips received from a plurality of sources, such as video capture devices of users. Operation 704 includes assigning an identifier to each media clip. The operation 704 may be performed by the media ingestion module 302 (see FIG. 3). In some embodiments, operation 704 is omitted. Operation 706 includes performing an analysis of the media clips to determine a temporal relation between the media clips. The operation 706 may be performed by the media analysis module 304 (see FIG. 3). Operation 708 includes combining the media clips based on their temporal relation to generate a video. In some embodiments, the combining is performed automatically. In certain embodiments, the combining is performed under the supervision of a user. The operation 708 may be performed by the content creation module 306 (see FIG. 3). Operation 710 includes publishing the generated video (e.g., publishing the video to a web site). The operation 710 may be performed by the content publishing module 302 (see FIG. 3). For example, the content publishing module 302 (see FIG. 3) may publish the presentation to a public network (e.g., the Internet), a nonpublic network (e.g., a closed network of video gaming devices), a mobile device (e.g., a cellular phone), and/or a stationary device (e.g., a kiosk or museum exhibit).

Although the individual operations of method 700 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Example embodiments may be implemented in one or a combination of hardware, firmware, and software. Example embodiments may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

What is claimed is:

1. A media synchronization system to synthesize a presentation of a multimedia event, the system comprising:
    a media ingestion module configured to access a plurality of media clips received from a plurality of client devices that include a first client device from which a first media clip with a first audio waveform is received and a second client device from which a second media clip with a second audio waveform is received;
    processing circuitry configured by a media analysis module to determine a temporal overlap of the first media clip received from the first client device with the second media clip received from the second client device, the temporal overlap of the first and second media clips being determined by matching a first fingerprint of at least part of the first media clip with a second fingerprint of at least part of the second media clip; and
    a content creation module configured to merge the first media clip and the second media clip into a group of overlapping media clips based on the temporal overlap determined by the matching of the first fingerprint with the second fingerprint, and to generate the presentation to include the group formed by merging the first and second media clips based on the temporal overlap.

2. The system of claim 1, the media ingestion module being configured to assign an identifier to the first media clip.

3. The system of claim 1, the plurality of media clips comprising at least one of video data, audio data, image data, or text data.

4. The system of claim 1, the plurality of media clips comprising a media clip recorded by a user.

5. The system of claim 1, the media analysis module further configuring the processing circuitry to generate recognition data associated with the first media clip.

6. The system of claim 1, the media analysis module further configuring the processing circuitry to group at least some of the plurality of media clips based on fingerprint matching.

7. The system of claim 1, the first media clip comprising audio data associated with video data, the content creation module being configured to separately align the audio data and the video data.

8. The system of claim 7, the content creation module being configured to separately align the audio data and the video data based on at least one of fingerprint matching, metadata matching, or lack of matching.

9. The system of claim 1, the content creation module being configured to combine the first media clip and the second media clip based on at least one of automatic combining or user-supervised combining.

10. The system of claim 1, the content creation module being configured to generate a media effect to be combined with the first media clip.

11. The system of claim 1 further comprising a content publishing module configured to publish the presentation.

12. The system of claim 11, the content publishing module being further configured to publish the presentation to at least one of a mobile device, a stationary device, a public network, or a nonpublic network.

13. The system of claim 1, wherein:
    each of the plurality of media clips is generated from an event by the plurality of client devices; and
    the media analysis module configures the processing circuitry to identify the first media clip and the second media clip as being generated from the event.

14. The system of claim 1, wherein:
    the first media clip and the second media clip are taken from the same event; and
    the media analysis module configures the processing circuitry to compute the first fingerprint from the first media clip taken from the same event and compute the second fingerprint from the second media clip taken from the same event.

15. The system of claim 1, wherein:
    the first media clip and the second media clip are separately recorded views of a single event; and
    the content creation module is configured to merge the first media clip and the second media clip based on a first audio fingerprint of the first media clip and on a second audio fingerprint of the second media clip.

16. The system of claim 1, wherein:
    the first media clip includes first footage filmed during a concert at a performance hall by the first client device located in a first part of the performance hall;
    the second media clip includes second footage filmed during the concert at the performance hall by the second client device located in a second part of the performance hall.

17. The system of claim 1, wherein:
    the first media clip includes first footage of a concert at a performance hall filmed by the first client device from a first angle within the performance hall during a first period of time during the concert;
    the second media clip includes second footage of the concert at the performance hall filmed by the second client device from a second angle within the performance hall during a second period of time that overlaps the first period of time during the concert.

18. A computerized method for synthesizing a presentation of a multimedia event, the method comprising:
    accessing a plurality of media clips received from a plurality of client devices that include a first client device from which a first media clip with a first audio waveform is received and a second client device from which a second media clip with a second audio waveform is received;
    determining a temporal overlap of the first media clip received from the first client device with the second media clip received from the second client device, the determining being performed by processing circuitry, the temporal overlap of the first and second media clips being determined by matching a first fingerprint of at least part of the first media clip with a second fingerprint of at least part of the second media clip;

merging the first media clip and the second media clip into a group of overlapping media clips based on the temporal overlap determined by the matching of the first fingerprint with the second fingerprint; and generating the presentation to include the group formed by the merging of the first and second media clips based on the temporal overlap.

19. The method of claim 18 further comprising assigning an identifier to the first media clip.

20. The method of claim 18, the plurality of media clips comprising at least one of video data, audio data, image data, or text data.

21. The method of claim 18, the plurality of media clips comprising a media clip recorded by a user.

22. The method of claim 18 further comprising processing the first media clip to generate recognition data associated with the first media clip.

23. The method of claim 18, the first media clip comprising audio data associated with video data, the merging comprising separately aligning the audio data and the video data.

24. The method of claim 23, the separate aligning of the audio data and the video data comprising separately aligning the audio data and the video data based on at least one of fingerprint matching, metadata matching, or lack of matching.

25. The method of claim 18, the combining comprising generating a media effect to be combined with the first media clip.

26. The method of claim 18, further comprising publishing the presentation.

27. The method of claim 26, the publishing comprising publishing to at least one of a mobile device, a stationary device, a public network, or a nonpublic network.

28. The method of claim 26, the publishing comprising displaying an advertisement.

29. The method of claim 18, wherein:
each of the plurality of media clips is generated from an event by the plurality of client devices; and
the determining of the temporal overlap of the first media clip and the second media clip includes identifying the first media clip and the second media clip as being generated from the event.

30. The method of claim 18, wherein:
the first media clip and the second media clip are taken from the same event; and the method further comprises
computing the first fingerprint from the first media clip taken from the same event and computing the second fingerprint from the second media clip taken from the same event.

31. The method of claim 18, wherein:
the first media clip and the second media clip are separately recorded views of a single event; and
the merging of the first media clip and the second media clip is based on a first audio fingerprint of the first media clip and on a second audio fingerprint of the second media clip.

32. The method of claim 18, wherein:
the first media clip includes first footage filmed during a concert at a performance hall by the first client device located in a first part of the performance hall;
the second media clip includes second footage filmed during the concert at the performance hall by the second client device located in a second part of the performance hall.

33. The method of claim 18, wherein:
the first media clip includes first footage of a concert at a performance hall filmed by the first client device from a first angle within the performance hall during a first period of time during the concert;
the second media clip includes second footage of the concert at the performance hall filmed by the second client device from a second angle within the performance hall during a second period of time that overlaps the first period of time during the concert.

34. A non-transitory machine-readable medium comprising instructions, which when implemented by one or more processors, cause the one or more processors to perform operations comprising:
accessing a plurality of media clips received from a plurality of client devices that include a first client device from which a first media clip with a first audio waveform is received and a second client device from which a second media clip with a second audio waveform is received;
determining a temporal overlap of the first media clip received from the first client device with the second media clip received from the second client device, the determining being performed by the one or more processors, the temporal overlap of the first and second media clips being determined by matching a first fingerprint of at least part of the first media clip with a second fingerprint of at least part of the second media clip;
merging the first media clip and the second media clip into a group of overlapping media clips based on the temporal overlap determined by the matching of the first fingerprint with the second fingerprint; and
generating the presentation to include the group formed by the merging of the first and second media clips based on the temporal overlap.

35. The non-transitory machine-readable medium of claim 34, wherein:
each of the plurality of media clips is generated from an event by the plurality of client devices; and
the determining of the temporal overlap of the first media clip and the second media clip includes identifying the first media clip and the second media clip as being generated from the event.

36. The non-transitory machine-readable medium of claim 34, wherein:
the first media clip and the second media clip are taken from the same event; and the operations further comprise
computing the first fingerprint from the first media clip taken from the same event and computing the second fingerprint from the second media clip taken from the same event.

37. The non-transitory machine-readable medium of claim 34, wherein:
the first media clip and the second media clip are separately recorded views of a single event; and
the merging of the first media clip and the second media clip is based on a first audio fingerprint of the first media clip and on a second audio fingerprint of the second media clip.

38. The non-transitory machine-readable medium of claim 34, wherein:
the first media clip includes first footage filmed during a concert at a performance hall by the first client device located in a first part of the performance hall;
the second media clip includes second footage filmed during the concert at the performance hall by the second client device located in a second part of the performance hall.

39. The non-transitory machine-readable medium of claim 34, wherein:

the first media clip includes first footage of a concert at a performance hall filmed by the first client device from a first angle within the performance hall during a first period of time during the concert;

the second media clip includes second footage of the concert at the performance hall filmed by the second client device from a second angle within the performance hall during a second period of time that overlaps the first period of time during the concert.

* * * * *